No. 818,393. PATENTED APR. 17, 1906.
C. F. PLUNKETT.
PIPE COUPLING FOR WATER CLOSETS, &c.
APPLICATION FILED APR. 12, 1905.

WITNESSES
Paul A. Blair
Walter Abbo

INVENTOR
Christopher F. Plunkett
BY
Howson and Howson
ATTORNEYS

UNITED STATES PATENT OFFICE.

CHRISTOPHER F. PLUNKETT, OF NEW YORK, N. Y., ASSIGNOR OF ONE-FOURTH TO JAMES J. PLUNKETT, OF NEW YORK, N. Y.

PIPE-COUPLING FOR WATER-CLOSETS, &c.

No. 818,393.      Specification of Letters Patent.      Patented April 17, 1906.

Application filed April 12, 1905. Serial No. 255,228.

*To all whom it may concern:*

Be it known that I, CHRISTOPHER F. PLUNKETT, a citizen of the United States of America, residing in the borough of Manhattan, city, county, and State of New York, have invented an Improved Pipe-Coupling for Water-Closet Bowls, &c., of which the following is a specification.

My invention relates to improved couplings for pipes, and is especially adapted to be employed in coupling the base of an earthenware water-closet with the metallic soil-pipe, although it is obvious that it may be used in other connections where an air and water tight joint is desired and where a threaded connection would be impracticable.

The object of my invention is to produce such a coupling which will be absolutely airtight, simple in construction, and efficient in use and which will permit expansion and contraction of the parts without loosening the joint or decreasing its efficiency.

Figure 1:
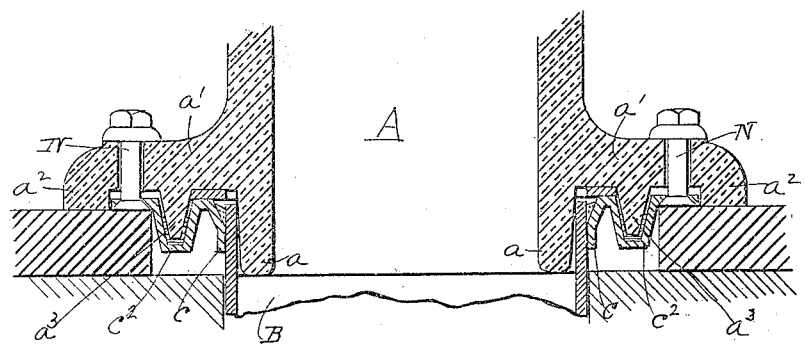
Figure 2:
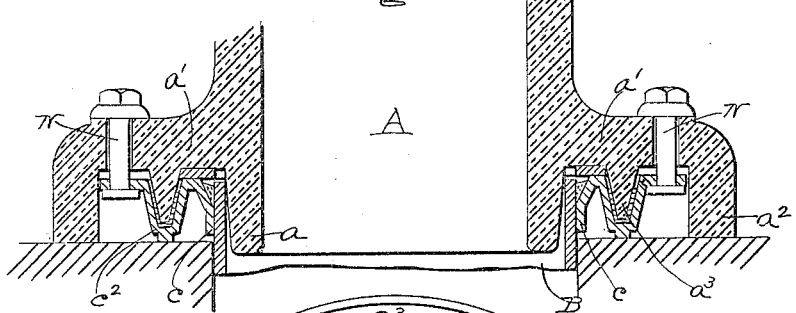
Figure 3:
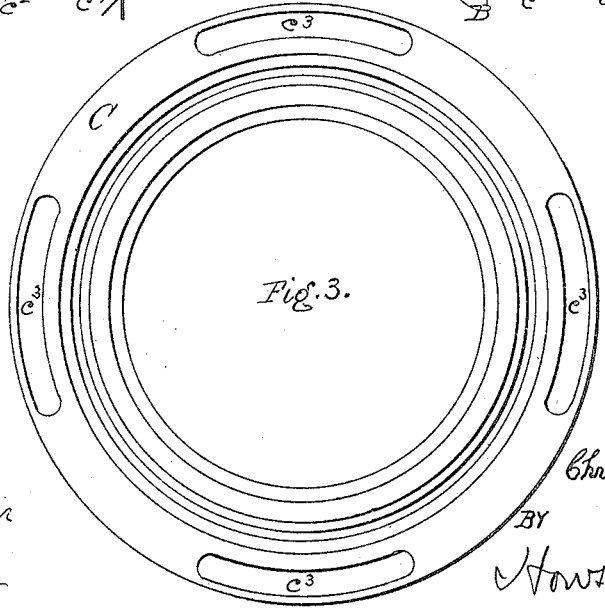

Referring to the accompanying drawings, Figure 1 represents a sectional elevation of my device as applied in connecting the base of a water-closet bowl with the soil-pipe. Fig. 2 is a modification of the same. Fig. 3 is a plan view of the ring surrounding the soil-pipe.

In the drawings, A shows the lower part of an earthenware water-closet bowl, having the spud $a$, fitting within the top of the soil-pipe B. This lower part A of the bowl has the laterally-projecting base $a'$ with the outer downwardly-projecting annular flange $a^2$, resting on the floor. Between this flange $a^2$ and the spud $a$ is an annular cavity for the ring C. In this hollowed portion I form between the spud and outer flange an intermediate flange $a^3$, also projecting downwardly.

The ring C has downwardly-bent inner flange $c$ closely surrounding the soil-pipe B and preferably having a beveled portion, whereby it may be securely connected by solder or other means to the soil-pipe. Extending around the central portion of the ring is an annular trough $c^2$, adapted to contain mercury or other non-evaporating liquid, into which the above-mentioned flange $a^3$ dips, thus making an absolutely gas-tight joint. The outer portion of this plate has several holes, preferably slots $c^3$, through which the bolts N may be passed for securing the plate to the base of the bowl in any suitable manner.

The ring C and bowl may be constructed, as shown in Fig. 1, to let the ring sit down into a hole in the floor large enough to receive the annular trough $c^2$, or the ring and bowl-base may be constructed as shown in Fig. 2, with the trough of the ring resting upon the floor. It is also preferable to provide a rubber gasket or other packing R to prevent the mercury or other sealing liquid from being blown out of its trough by gas or other pressure.

I claim as my invention—

1. In a coupling for connecting closet-bowls or the like to a soil-pipe, the combination with a hollowed base, a ring surrounding and secured to said soil-pipe with a central annular trough, and slots about its outer edge with means for securing said ring to said base.

2. In a coupling for connecting closet-bowls or the like, to a soil-pipe, the combination with a hollowed base, a spud thereon, fitting within the soil-pipe, a ring surrounding and secured to said soil-pipe with a central annular trough, slots about its outer edge and bolts passing through said hollowed base and slots for securing said ring to said base.

3. In a coupling for connecting closet-bowls or the like, to a soil-pipe, the combination with a hollowed base having an outer flange, an inner spud fitting within the soil-pipe, and an intermediate flange, and a ring about said soil-pipe and between the spud and outer flange secured thereto, having a trough into which said intermediate flange dips, said ring adapted to be secured to said base by bolts.

4. In a coupling for connecting closet-bowls or the like, to a soil-pipe, the combination with a hollowed base, having an outer flange, an inner spud fitting within the soil-pipe, and an intermediate flange, and a ring about said soil-pipe and between the spud and outer flange, secured thereto, having a trough into which said intermediate flange dips, said trough and ring adapted to form a liquid seal.

In testimony whereof I have signed my name to this specification in the presence of two subscribing witnesses.

CHRISTOPHER F. PLUNKETT.

Witnesses:
    HUBERT HOWSON,
    EDNA W. COLLINS.